Nov. 19, 1957 F. W. HOTTENROTH, JR 2,813,681

STEAM TRAPS

Filed May 29, 1953

INVENTOR.
FREDERICK W. HOTTENROTH, JR.

BY

ATTORNEYS

United States Patent Office 2,813,681
Patented Nov. 19, 1957

2,813,681

STEAM TRAPS

Frederick W. Hottenroth, Jr., Newton, Mass., assignor to Standard-Thomson Corporation, Boston, Mass., a corporation of Delaware Application May 29, 1953, Serial No. 358,435

1 Claim. (Cl. 236—56)

The present invention relates to steam traps, and more particularly to steam traps comprising a bellows containing a thermostatic fluid.

One form of bellows-type steam trap is illustrated by the Clifford and Woods Patent 1,842,657 granted January 26, 1932, in which a bellows is mounted directly opposite an orifice, and a valve member associated with the bellows is adapted to close the orifice upon a rise in temperature and to open the orifice upon a fall in temperature to a predetermined value. This conventional type of unit may be objectionable in that its operation is "non-modulating," in that under certain temperature and pressure conditions a greater pressure differential is required to start the valve open than to maintain it open; in other words, the valve will start to open from its closed position at a lower temperature than it will start to close from an open position. As a result, the valve will snap wide open and then upon an increase of temperature, it will snap shut so that it continually operates on a snap cycle which causes rapid deterioration of the bellows. Furthermore, in some instances it is necessary to use a long cooling leg to cool to the point at which the steam trap will open. This large temperature differential necessary to start the valve open is undesirable in industrial applications where close control is desired. In heating installations the radiator may become practically waterlogged before the required temperature differential is obtained.

The object of the present invention is to provide improvements in steam traps with a view toward a modulating action whereby the valve starts to open smoothly at a temperature only slightly below the steam temperature and continues to open further upon continued reduction in temperature.

With this object in view the invention comprises a steam trap in which a contraction of the bellows operates through a suitable linkage to open a valve which is on the opposite side of the orifice plate from the bellows itself. This arrangement may be constructed to have a desirable modulating action which entirely avoids the snap action above described in the conventional type.

In the accompanying drawings—

Figure 1:
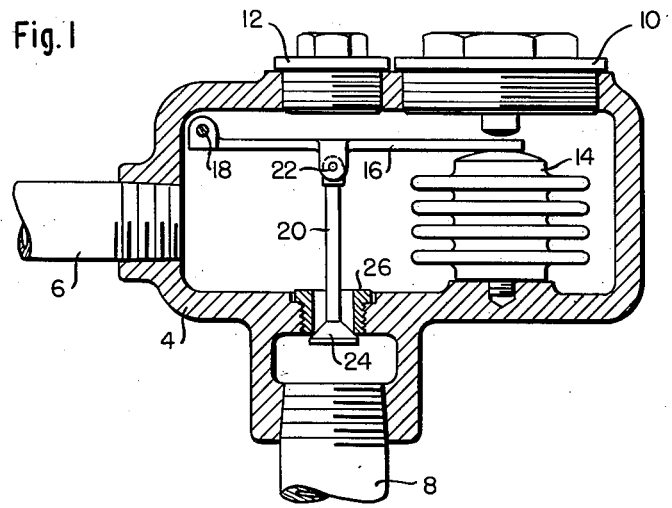
Figure 2:
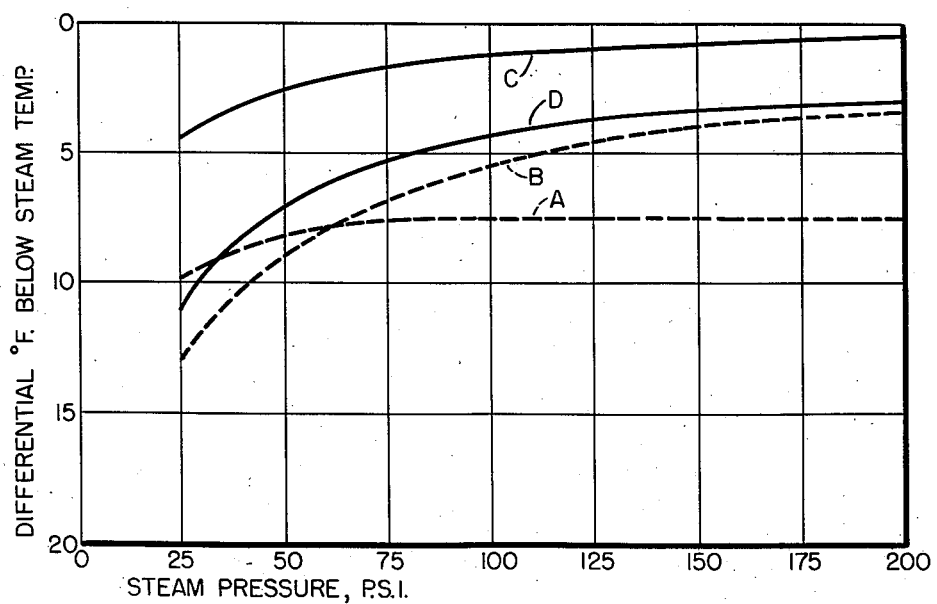

Fig. 1 is an elevation of a steam trap according to the preferred form of the present invention, and Fig. 2 is a diagram showing the comparison of operating conditions with the steam trap of the present invention and a conventional steam trap.

The illustrated embodiment of the invention comprises a body 4 provided with an inlet connection 6 and an outlet connection 8. The inlet connection 6 is provided with any suitable means for connection to a radiator or other steam unit. The outlet connection 8 is arranged to be connected in the usual manner to the return pipe of the steam system. The upper portion of the body is closed by suitable caps 10 and 12 for providing access to the bellows and to the valve in a manner which will be apparent from the subsequent description.

Mounted in the body 4 opposite the cap 10 is an expansible member, preferably in the form of a closed bellows 14 filled with a suitable thermostatic fluid. As described in the Clifford Patent 1,816,142 granted July 28, 1931, the filling medium preferably comprises a small quantity of water and water vapor, the air being substantially entirely evacuated from the interior of the bellows. The advantage of the use of water in the bellows is that it has the same vapor pressure characteristic as that of the steam itself.

The upper end of the bellows engages the end of a pivoted link 16. The bar 16 is pivoted on a pin 18 which is suitably secured in the body of the unit. A valve stem 20 is connected to an intermediate point of the bar and is pivoted thereto as indicated at 22 in order to allow for some lateral movement of the valve as the bar 16 turns on its pivot. The stem 20 carries at its lower end a valve 24. The stem passes through an orifice formed in a plug 26 which is received in the body 4 immediately above the outlet connection 8.

It will be seen that the valve 24 closes against the orifice upon expansion of the bellows and opens upon contraction. The difference from the existing valve is that the valve member seats against the under (outlet) side of the orifice pipe instead of on the upper side. This arrangement provides for a modulating control which will be described in conjunction with the diagram of Fig. 2.

In Fig. 2 the curves A and B shown in dotted lines illustrate the operation of a conventional steam trap. Taking for example the condition of 200 p. s. i. steam pressure, the valve will not start to open until there is a temperature differential of 7½° below steam temperature. However, as shown by curve B, the valve when fully open would start to reclose at a temperature of only 3½° below steam temperature. As a consequence, the valve opens wide and then remains open until the temperature rises to a point where the differential is 3½°, whereupon it snaps suddenly into the close position. As heretofore noted, this snap action is detrimental in that it not only gives poor control, but results in rapid deterioration of the bellows.

It will be observed that the two curves A and B cross at a steam pressure of about 60 p. s. i. With low pressure steam, therefore, this type of valve does not give the above described snap action. However, for high pressure steam, the fact that the curves cross and the curve B lies above the curve A means that the temperature differential is greater for "start open" than for "full open," and this results in the undesirable action above described.

Curves C and D are the corresponding "start" and "full open" curves for a steam trap according to the present invention. It will be noted that the start curve C is above the full open curve D for all pressures. Taking the 200 p. s. i. condition, the valve starts to open at a pressure differential of about one-half degree and is full open at about three degrees. This is a "modulating" operation in that the passage for condensate is enlarged as the temperature differential increases. The action is smooth and does not involve snap action of the conventional trap.

The operation of the present invention depends upon the resultant of the various forces acting on the system. In any case, there is a force due to the operation of the bellows itself, a second force due to the pressure of the steam against the valve, and a third force arising from the flow of steam or condensate through the orifice when the valve is open, this latter being in the nature of a Bernoulli force. In the conventional steam trap, the second of the above mentioned forces does not act upon the full cross-section of the valve stem itself until the valve is off its seat, whereupon it acts with full force to slam the valve to its full open position. In the present invention, on the other hand, the steam pressure is always acting on the central portion of the valve 24 and hence tends to open the valve smoothly even after the valve is cracked open. After opening, there is a tendency toward balanced pressure effect by reason of the exposure of the underside of the valve to the steam pressure, but owing to the expansion of steam through the orifice the action is smooth.

Having thus described my invention, I claim:

A steam trap comprising a body defining a fluid chamber and having a single outlet in the bottom of the chamber, a single inlet and a valve orifice leading to the outlet, a valve member having a head to seat against the orifice on the outlet side thereof, a closed metallic bellows within the body, said bellows being substantially entirely filled with water and water vapor and having one end thereof secured to the bottom of the chamber and the other end extending into the chamber, a link having one end pivoted about a point within the chamber and the other end engaging said other end of the bellows, and a stem connecting the valve member with the link intermediate the pivot and the bellows to move the valve member toward and away from the orifice upon expansion and contraction, respectively, of the bellows.

References Cited in the file of this patent

UNITED STATES PATENTS

| 982,229 | Adair | Jan. 24, 1911 |
| 1,074,660 | Squire | Oct. 7, 1913 |
| 1,100,112 | Bain | June 16, 1914 |

FOREIGN PATENTS

| 28,568 | Germany | Aug. 30, 1884 |